(12) United States Patent
Daughtry et al.

(10) Patent No.: US 8,766,110 B2
(45) Date of Patent: Jul. 1, 2014

(54) BUSHINGS, SEALING DEVICES, TUBING, AND METHODS OF INSTALLING TUBING

(75) Inventors: David Daughtry, Portland, TN (US); Jordan Strunk, Portland, TN (US)

(73) Assignee: Titeflex Corporation, Springfield, MA (US)

( * ) Notice: Subject to any disclaimer, the term of this patent is extended or adjusted under 35 U.S.C. 154(b) by 94 days.

(21) Appl. No.: 13/584,074

(22) Filed: Aug. 13, 2012

(65) Prior Publication Data

US 2013/0087381 A1   Apr. 11, 2013

Related U.S. Application Data

(60) Provisional application No. 61/544,516, filed on Oct. 7, 2011.

(51) Int. Cl.
*H02G 3/18* (2006.01)

(52) U.S. Cl.
USPC ........... 174/660; 174/650; 174/652; 439/271; 285/334.5

(58) Field of Classification Search
USPC ........ 174/660, 650, 652; 285/334.5; 439/271, 439/278, 279
See application file for complete search history.

(56) References Cited

U.S. PATENT DOCUMENTS

| 3,176,064 A | 3/1965 | Browne |
|---|---|---|
| 4,103,320 A | 7/1978 | de Putter |
| 5,087,084 A | 2/1992 | Gehring |
| 5,237,129 A | 8/1993 | Obara |
| 5,441,312 A | 8/1995 | Fujiyoshi et al. |
| 5,483,412 A | 1/1996 | Albino et al. |
| 5,619,015 A | 4/1997 | Kirma |
| 5,634,827 A | 6/1997 | Francois et al. |
| 5,716,193 A | 2/1998 | Mondet et al. |
| 6,036,237 A | 3/2000 | Sweeney |
| 6,173,995 B1 | 1/2001 | Mau |
| 6,840,803 B2 | 1/2005 | Wlos et al. |
| 7,390,027 B2 | 6/2008 | Kiely |
| 7,607,700 B2 | 10/2009 | Duquette et al. |
| 7,621,567 B2 * | 11/2009 | Duquette et al. ........... 285/334.5 |
| 8,399,767 B2 | 3/2013 | Duquette et al. |

(Continued)

FOREIGN PATENT DOCUMENTS

| EP | 1180631 A2 | 2/2002 |
|---|---|---|
| EP | 1313190 A1 | 5/2003 |

(Continued)

OTHER PUBLICATIONS

Parmley, "Machine Devices and Components" Illustrated Sourcebook 2005.

(Continued)

*Primary Examiner* — Dhirubhai R Patel
(74) *Attorney, Agent, or Firm* — Brian R. Landry; Saul Ewing LLP

(57) ABSTRACT

Bushings, sealing devices, tubing, and methods of installing tubing are provided. One aspect of the invention provides a bushing having one or more axially-extending tongues. Another aspect of the invention provides a sealing device for connecting a length of tubing. The sealing device includes a body member defining a sleeve portion and a bushing arranged to be received in the sleeve portion. The bushing includes one or more tongues adapted and configured to be received over at least one layer of the tubing.

23 Claims, 8 Drawing Sheets

(56) References Cited

U.S. PATENT DOCUMENTS

| | | |
|---|---|---|
| 2007/0018450 A1 | 1/2007 | Golafshani |
| 2007/0273148 A1 | 11/2007 | Duquette et al. |
| 2007/0273149 A1 | 11/2007 | Duquette et al. |
| 2008/0169643 A1 | 7/2008 | Marban et al. |
| 2010/0090459 A1 | 4/2010 | Duquette et al. |
| 2010/0181760 A1 | 7/2010 | Duquette et al. |
| 2010/0201124 A1* | 8/2010 | Duquette et al. ............ 285/382.7 |
| 2011/0041944 A1 | 2/2011 | Duquette et al. |
| 2011/0042139 A1 | 2/2011 | Duquette et al. |

FOREIGN PATENT DOCUMENTS

| | | |
|---|---|---|
| GB | 650082 | 2/1951 |
| GB | 650082 A | 2/1951 |
| WO | 2005059424 A1 | 6/2005 |
| WO | WO-2005059424 A1 | 6/2005 |
| WO | 2007042832 A1 | 4/2007 |
| WO | WO-2007042832 A1 | 4/2007 |
| WO | 2008118944 A2 | 10/2008 |
| WO | WO-2008118944 A2 | 10/2008 |
| WO | 2011022124 A1 | 2/2011 |
| WO | WO-2011022124 A1 | 2/2011 |

OTHER PUBLICATIONS

Guard-Nut Inc., "Shear-Type System" http://www.guardnut.com/torque_limiting.html, Sep. 29, 2011.

International Search Report for International Application No. PCT/US2012/050103 mailed Feb. 21, 2013.

Written Opinion for International Application No. PCT/US2012/050103 mailed Feb. 21, 2013.

* cited by examiner

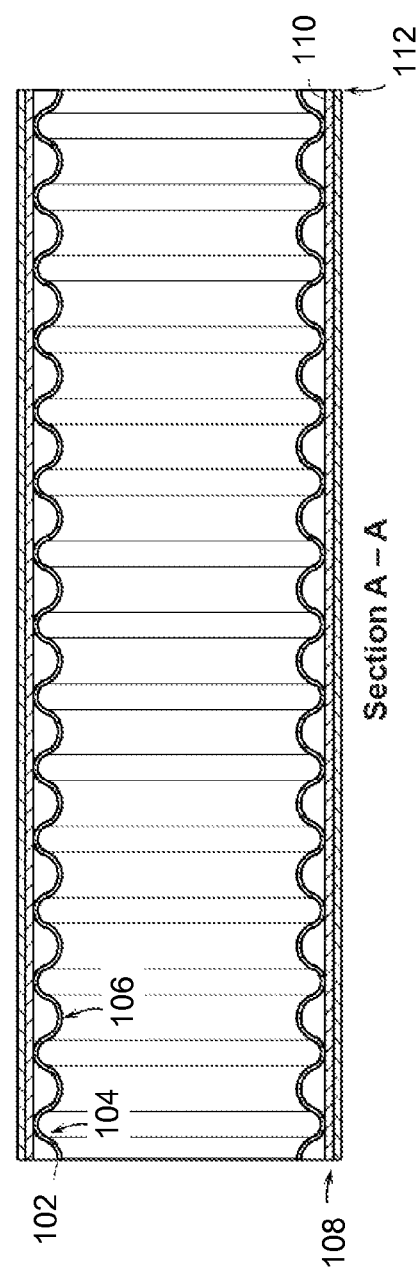
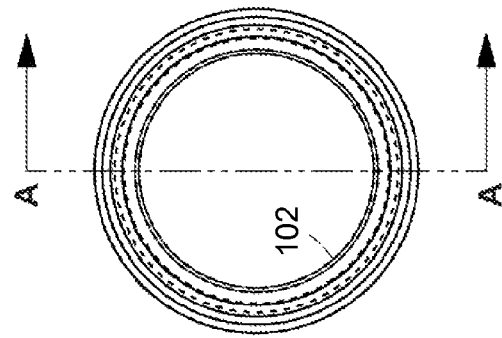
FIG. 1

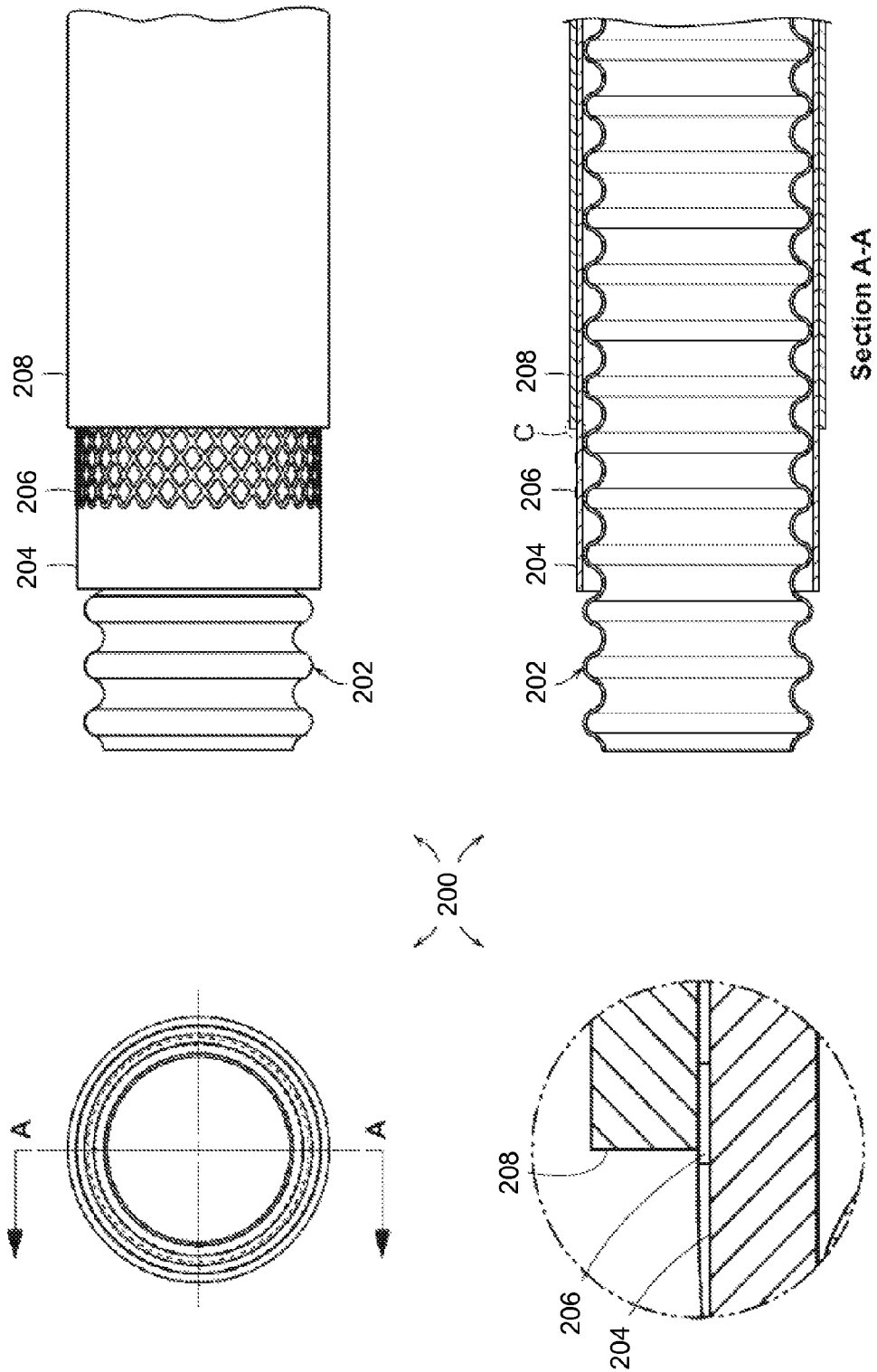

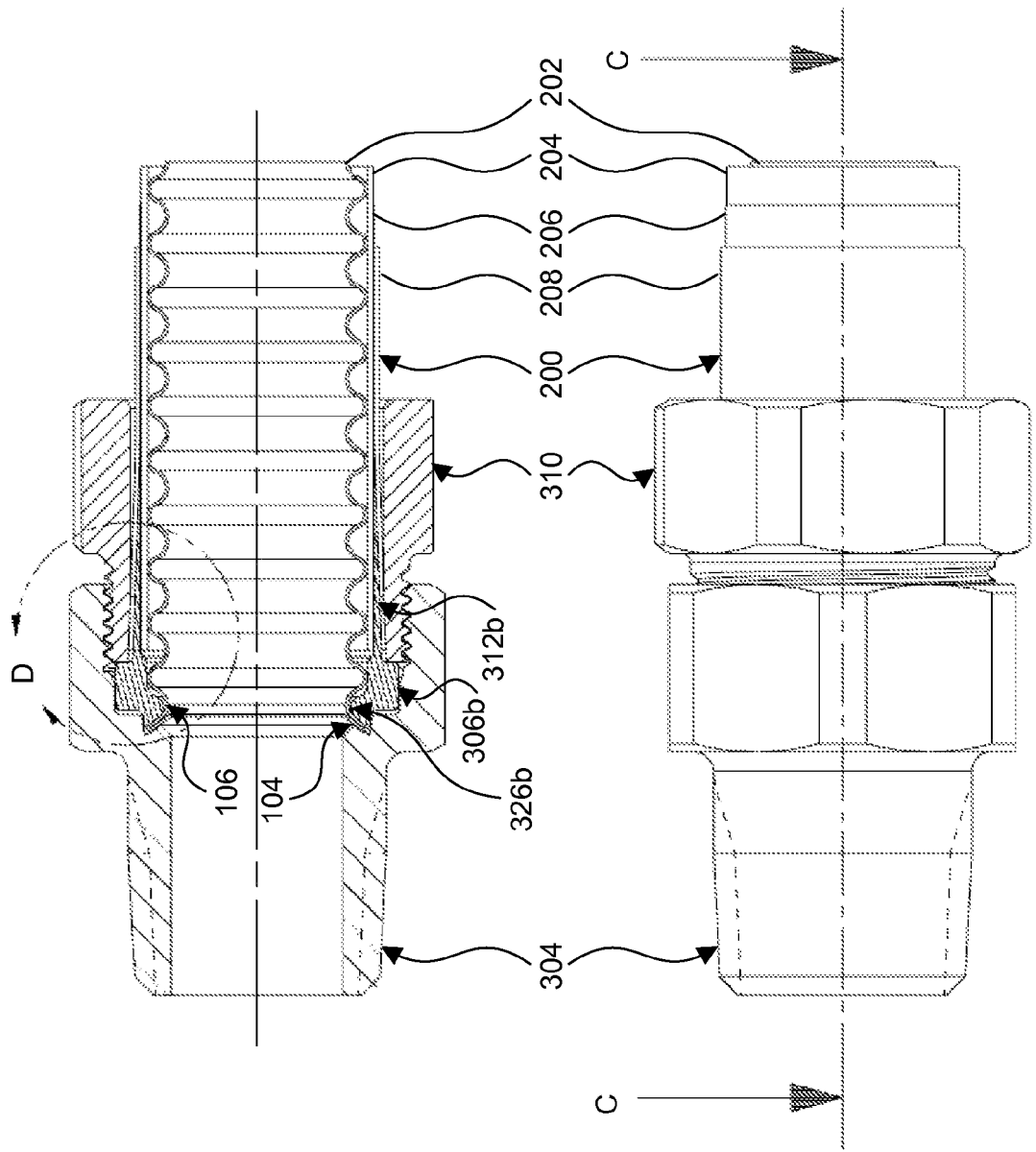

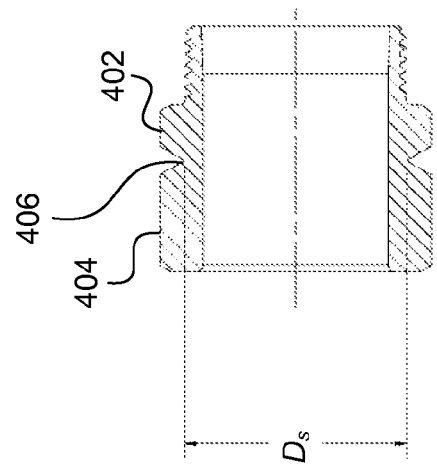
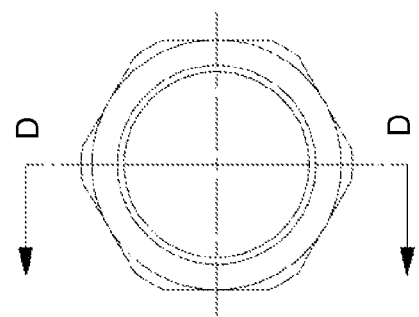
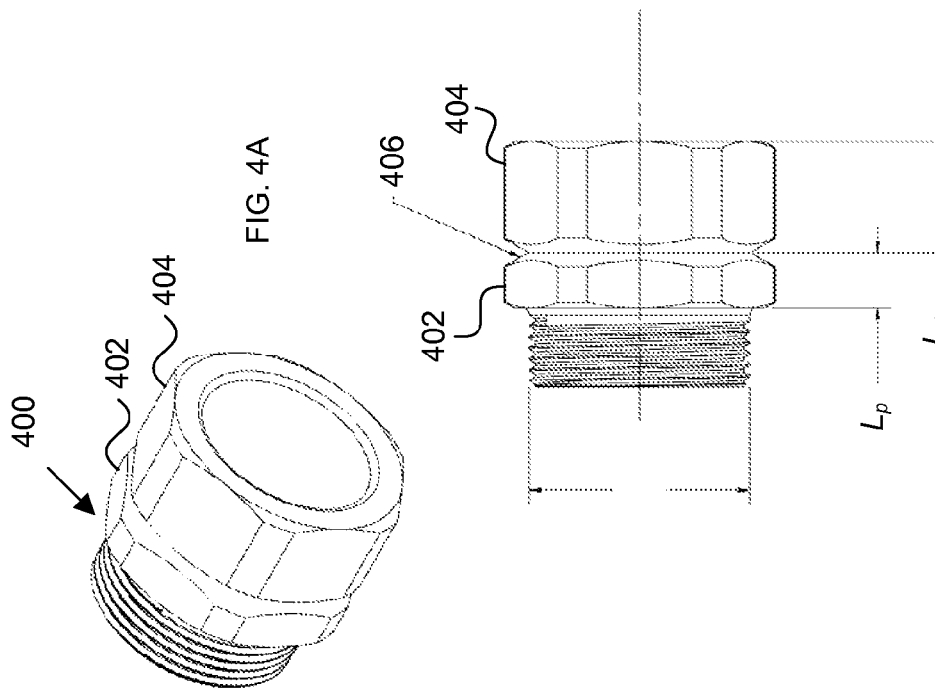
FIG. 4D
FIG. 4C
FIG. 4A
FIG. 4B

BUSHINGS, SEALING DEVICES, TUBING, AND METHODS OF INSTALLING TUBING

CROSS-REFERENCE TO RELATED APPLICATION

This application claims priority to U.S. Provisional Patent Application Ser. No. 61/544,516, filed Oct. 7, 2011. The entire contents of this application are hereby incorporated by reference herein.

FIELD OF INVENTION

The present invention relates to gas, liquid, and slurry piping systems as well as protective conduit systems for cable carrying purposes, and more particularly to bushings, sealing devices, tubing, methods of installing tubing incorporating fittings capable of transferring and dissipating energy.

BACKGROUND OF THE INVENTION

Gas and liquid piping systems utilizing corrugated stainless steel tubing ("CSST") and fittings are known. Such piping systems can be designed for use in combination with elevated pressures of up to about 25 psi or more and provide advantages over traditional rigid black iron piping systems in terms of ease and speed of installation, elimination of onsite measuring, and reduction in the need for certain fittings such as elbows, tees, and couplings. Undesirably, the thin metal walls are vulnerable to failure when exposed to physical or electrical forces, such as lightning or fault currents.

Often, electrical currents will occur inside a structure. These electrical currents, which can vary in duration and magnitude, can be the result of power fault currents or induced currents resulting from lightning interactions with a house or structure. The term "fault current" is typically used to describe an overload in an electrical system, but is used broadly herein to include any electrical current that is not normal in a specific system. These currents can be the result of any number of situations or events such as a lightning event. Electrical currents from lightning can reach a structure directly or indirectly. Direct currents result from lightning that attaches to the actual structure or a system contained within the structure. When current from a nearby lightning stroke moves through the ground or other conductors into a structure, it is referred to as indirect current. While both direct and indirect currents may enter a structure through a particular system, voltage can be induced in other systems in the structure, especially those in close proximity to piping systems. This can often result in an electrical flashover or arc between the adjacent systems. A flashover occurs when a large voltage differential exists between two electrical conductors, causing the air to ionize, the material between the conductive bodies to be punctured by the high voltage, and formation of a spark.

It usually takes a very large voltage differential to create a flashover through a good dielectric material. When a flashover does occur, the flow of electrons through the ionized path causes energy dissipation through heating and a shockwave (i.e., sound). The extent of heat and shock is directly related to the duration and magnitude of the electrical energy in the flashover. Frequently, the voltage required to breakdown a dielectric material is enough to drive a relatively large amount of energy across the associated spark often resulting in damage to both conductors and any material between them. The primary mode of failure is extreme heating and melting of these materials.

Metals are electrically conductive materials, making CSST a very good pathway for electrical currents. This leads to the potential for a flashover if the CSST is installed in close proximity to another conductor within a structure and either one becomes energized. A flashover like this is often the result of a lightning event but it is foreseeable that other events may also be capable a producing a sufficient voltage differential between conductors. It is possible that a flash like this can cause enough heat generation to melt a hole in the CSST, allowing fuel gas to escape. This scenario is worsened by the dielectric jacket that often surrounds CSST. This jacket typically breaks down in a very small area, creating a pinhole as a result of the flashover. This phenomenon focuses the flash and concentrates the heating of the stainless steel inside. The result is a reduced capability of the CSST to resist puncture from flashover compared to un-jacketed pipe.

Accordingly, it would be desirable to provide corrugated tubing and sealing devices having an increased resistance to physical and electrical forces that approaches that of conventional black iron pipe.

SUMMARY OF THE INVENTION

Bushings, sealing devices, tubing, and methods of installing tubing are provided.

One aspect of the invention provides a bushing having one or more axially-extending tongues.

This aspect of the invention can have a variety of embodiments. The bushing can be a split bushing. The bushing can be a two-piece bushing. The bushing can include two halves coupled by a living hinge. The bushing can include at least two axially-extending tongues. The one or more axially-extending tongues can have a substantially semi-circular profile.

The one or more axially-extending tongues can be tapered toward an end of the bushing.
The one or more axially-extending tongues can have a taper angle of between about 1° and about 4°. The one or more axially-extending tongues can have a taper angle of between about 2° and about 3°.

The bushing can be fabricated from a conductive material. The conductive material can be a metal. The metal can be selected from the group consisting of: aluminum, copper, gold, iron, silver, zinc, and an alloy thereof. The alloy can be selected from the group consisting of brass, bronze, steel, and stainless steel.

The bushing can further include one or more substantially circumferential ribs adapted to engage one or more corrugations of a tube. The one or more substantially circumferential ribs can be located on a substantially opposite end of the bushing from the one or more axially-extending tongues.

The tube can be corrugated. The tube can be corrugated stainless steel tubing.

The one or more axially-extending tongues can be adapted to form electrical continuity with the tube. The tube can include one or more conductive jacket layers and the one or more axially-extending tongues can be adapted to form electrical continuity with at least one of the one or more conductive jacket layers.

Another aspect of the invention provides a sealing device for connecting a length of tubing. The sealing device includes a body member defining a sleeve portion and a bushing arranged to be received in the sleeve portion. The bushing includes one or more tongues adapted and configured to be received over at least one layer of the tubing.

This aspect of the invention can have a variety of embodiments. The sealing device can further include a nut adapted and configured for threaded coupling with the body member. The bushing and the nut can be dimensioned such that as the nut is tightened, the one or more tongues are compressed against the tubing by the nut.

The tubing can include a jacket. The bushing and the nut can be dimensioned such that as the nut is tightened, one or more layers of the jacket are compressed between an interior surface of the nut and an exterior surface of the one or more tongues.

The bushing and the nut can be dimensioned such that as the nut is tightened, the one or more tongues are compressed against one or more layers of the jacket by the nut.

The nut can have an external thread and the sleeve portion of the body member can have a complimentary internal thread.

The nut can have a tapered inner surface.

The nut can include a torque-limiting feature. The torque-limiting feature can be a shear point.

Another aspect of the invention provides a length of tubing including an inner tubing layer and a fitting coupled to an end of the tubing. The fitting includes a body member defining a sleeve portion and a bushing extending partially over at least the inner tubing layer and received along with at least the inner tubing layer in the sleeve portion. The bushing includes one or more tongues adapted and configured to be received over the inner tubing layer.

This aspect of the invention can have a variety of embodiments. The length of tubing can further include a conductive layer surrounding the outside of the inner tubing layer. The one or more tongues can be in contact with the conductive layer. The one or more tongues can be positioned between the inner tubing layer and the conductive layer. The length of tubing can further include an outer tubing layer surrounding the outside of the conductive layer. The one or more tongues can be positioned between the conductive layer and the outer tubing layer.

The inner tubing layer can be metallic tubing. The inner tubing layer can be thin-walled tubing. The inner tubing layer can be flexible tubing. The inner tubing layer can be corrugated tubing. The outer tubing layer can be a resin layer.

The conductive layer can include a metal. The metal can be selected from the group consisting of: aluminum, copper, gold, iron, silver, zinc, and an alloy thereof. The alloy can be selected from the group consisting of brass, bronze, steel, and stainless steel. The metal can be a metal foil. The metal foil can completely surround the inner tubing layer. The metal foil can be an expanded metal foil. The metal can be one or more metal wires. The conductive layer can comprise a conductive resin.

The length of tubing can further include an inner resin layer positioned between the inner tubing layer and the conductive layer.

Another aspect of the invention provides a method of installing energy dissipative tubing. The method includes: providing a length of tubing including an inner tubing layer, providing a sealing device including a body member defining a sleeve portion and a bushing including one or more tongues adapted and configured to be received over the inner tubing layer; placing the bushing over at least the inner tubing layer such that the one or more tongues are positioned over the inner tubing layer; and inserting the bushing and at least the inner tubing layer into the sleeve portion.

This aspect of the invention can have a variety of embodiments. The method can include coupling the sealing device to a device selected from the group consisting of: a pipe, a manifold, a meter, a gas main, a tank, and an appliance. The pipe can be black iron pipe. The appliance can be selected from the group consisting of: a stove, an oven, a grill, a furnace, a clothes dryer, a fireplace, and a generator.

The length of tubing can include a conductive layer surrounding the outside of the inner tubing layer. The one or more tongues can be positioned in contact with the conductive layer. The one or more tongues can be positioned between the inner tubing layer and the conductive layer.

The length of tubing can include an outer tubing layer surrounding the outside of the conductive layer. The one or more tongues can be positioned between the conductive layer and the outer tubing layer.

The method can further include tightening a nut to advance the bushing. The step of tightening a nut can includes tightening the nut until a torque-limiting portion of the nut shears.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein:

FIG. 1 depicts a multi-layer jacketed tube in accordance with the prior art.

FIG. 2 depicts an energy dissipative tube in accordance with the prior art.

FIGS. 3A-3F depict embodiments of a sealing device and tubing assembly in accordance with preferred embodiments of the invention.

FIGS. 4A-4D depict a nut including a torque-limiting feature in accordance with a preferred embodiment of the invention.

DEFINITIONS

Figure 3A:
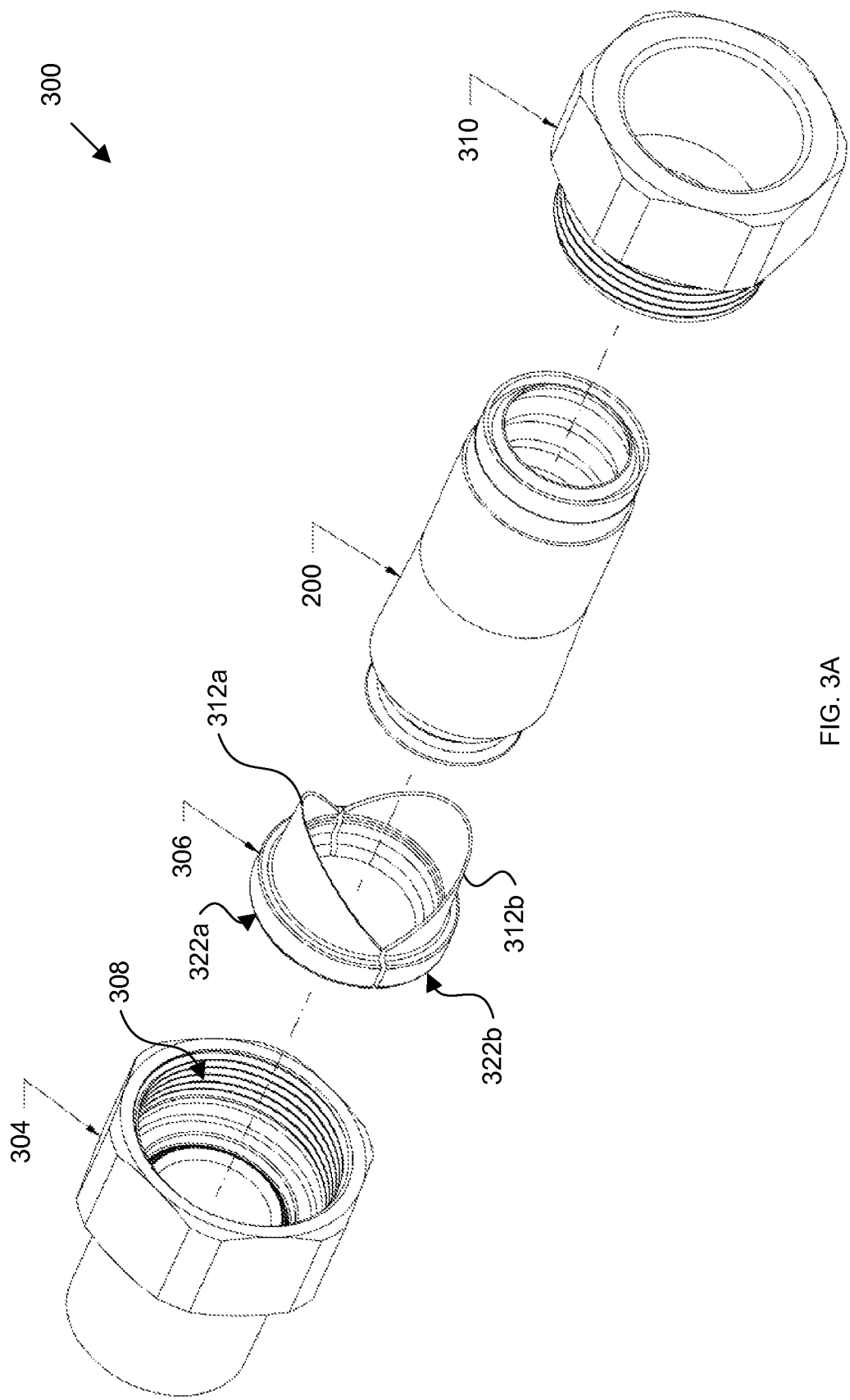

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "alloy" refers to a homogenous mixture or metallic solid solution composed of two or more elements. Examples of alloys include austenitic nickel-chromium-based superalloys, brass, bronze, steel, low carbon steel, phosphor bronze, stainless steel, and the like.

As used in the specification and claims, the terms "comprises," "comprising," "containing," "having," and the like can have the meaning ascribed to them in U.S. patent law and can mean "includes," "including," and the like.

As used herein, the terms "corrugated stainless steel tubing" and "CSST" refer to any type of tubing or piping, which may accommodate corrosive or aggressive gases or liquids, and includes but is not limited to tubing or piping made from: thermoplastics, metal or metal alloy materials such as olefin-based plastics (e.g., polyethylene (PE)), fluorocarbon polymers (e.g., polytetrafluoroethylene (PTFE)), carbon steel, copper, brass, aluminum, titanium, nickel, and alloys thereof.

Unless specifically stated or obvious from context, the term "or," as used herein, is understood to be inclusive.

As used herein, the term "metal" refers to any chemical element that is a good conductor of electricity and/or heat. Examples of metals include, but are not limited to, aluminum, cadmium, niobium (also known as "columbium"), copper, gold, iron, nickel, platinum, silver, tantalum, titanium, zinc, zirconium, and the like.

As used herein, the term "resin" refers to any synthetic or naturally occurring polymer.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Corrugated Tubing

Referring to FIG. 1, a length of corrugated tubing 102 according to the prior art is provided. The corrugated tubing 102 may be composed of stainless steel or any other suitable material. The tubing 102 contains a number of corrugation peaks 104 and corrugation valleys 106. A jacket 108 (e.g., a multi-layer jacket) covers the outside of the tubing 102.

The jacket 108 can include a plurality of layers 110, 112. The layers 110, 112 generally form an annulus around the tubing 102, but may have a circular or non-circular cross-section.

Energy Dissipative Tubing

Referring now to FIG. 2, in order to better absorb energy from fault currents and lightning strikes, energy dissipative jackets are provided that dissipate electrical and thermal energy throughout the respective jackets, thereby protecting the tubing 202. The term "dissipate" encompasses distributing electrical energy to an appropriate grounding device such as a fitting.

Preferred embodiments of energy dissipative jackets preferably include one or more conductive layers for distributing electricity and heat. The conductive layers can include, for example, conductive resins and/or metals as discussed herein.

One embodiment of energy dissipative tubing 200 is depicted in FIG. 2. The energy dissipative tubing 200 includes a length of tubing 202. The tubing 202 can be metal tubing, thin-walled metal tubing, corrugated tubing, corrugated stainless steel tubing, or the like.

Tubing 202 is surrounded by a first resin layer 204, a metal layer 206, and a second resin layer 208. Resin layers 204, 208 can be formed from insulative and/or conductive resins.

Insulating resin layers can be formed from a variety of materials. In some embodiments, an insulating elastic layer includes polytetrafluoroethylene (PTFE). Other suitable insulators include polyolefin compounds, thermoplastic polymers, thermoset polymers, polymer compounds, polyethylene, crosslinked polyethylene, UV-resistant polyethylene, ethylene-propylene rubber, silicone rubber, polyvinyl chloride (PVC), ethylene tetrafluoroethylene (ETFE), and ethylene propylene diene monomer (EPDM) rubber.

Conductive resin layers can be formed by impregnating a resin with conductive material such as metal particles (e.g., copper, aluminum, gold, silver, nickel, and the like), carbon black, carbon fibers, or other conductive additives. In some embodiments, the metal layer 206 and/or one or more of the resin layers 204, 208 has a higher electrical conductivity than the tubing 202. In some embodiments, the volume resistivity of the conductive resin can be less than about $10^6$ ohm-cm (e.g., $9 \times 10^6$ ohm-cm) as tested in accordance with ASTM standard D4496.

In some embodiments, each resin layer 204, 208 has a thickness of about 0.015" to about 0.035".

Metal layer 206 can include one or more metals (e.g., ductile metals) and alloys thereof. The metal(s) can be formed into foils, perforated foils, tapes, perforated tapes, cables, wires, strands, meshes, braids, and the like.

In some embodiments, the metal layer 206 is an expanded metal foil as further described in U.S. Patent Application Publication No. 2011-0041944. A variety of expanded metal foils are available from the Dexmet Corporation of Wallingford, Conn. An exemplary embodiment of energy dissipative tubing 200 with expanded metal foil is depicted in FIG. 2.

In some embodiments, the metal layer 206 completely surrounds the first resin layer 24. In such embodiments, the metal may overlap and/or be welded or soldered in some regions. In other embodiments, the metal layer 206 substantially surrounds the first resin layer 204. In such embodiments, a small portion of the first resin layer 204 (e.g., less than about 1°, less than about 2°, less than about 3°, less than about 4°, less than about 5°, less than about 10°, less than about 15°, less than about 20°, and the like) is not surrounded by the metal layer 26. In still other embodiments, the metal layer 206 can be wrapped spirally or helically around the first resin layer 204. In such an embodiment, the metal layer 26 can overlap or substantially surround the first resin layer 204.

In some embodiments, the metal layer 206 is a conventional, non-expanded metal foil, such as aluminum or copper foil that can, in some embodiments, completely envelop the inner resin layer 206.

Various thicknesses of the resin layers 204, 208 and the metal layer 206 can be selected to achieve desired resistance to lightning strikes and physical damage while maintaining desired levels of flexibility. In embodiments including an expanded metal foil, the mass per area can be adjusted to provide an appropriate amount of energy dissipation. The resin layers 24, 28 can be the same or different thickness and can include the same or different materials. Various colors or markings can be added to resin layers, for example, to clearly distinguish the resin layers 24, 28 from each other and from the metal layer 206 and/or to make the tubing 200 more conspicuous.

Sealing Devices

Referring now to FIG. 3A, an exploded view of a sealing device and tubing assembly 300 is provided. The assembly 300 allows for the sealing and coupling of an end of tubing 200 to a pipe, a manifold, an appliance, and the like (not depicted). For example, after body member 304 is threaded onto a manifold (not depicted), tubing 200 and bushing 306 can be placed inside the sleeve portion 308 of the body member 304 and sealed by advancing a nut 310 as further discussed below.

Although the assembly 300 can be used with a variety of types of CSST, the bushing 306 is particularly advantageous when used with energy dissipative tubing 200 having one or more conductive layers.

Figure 3D:
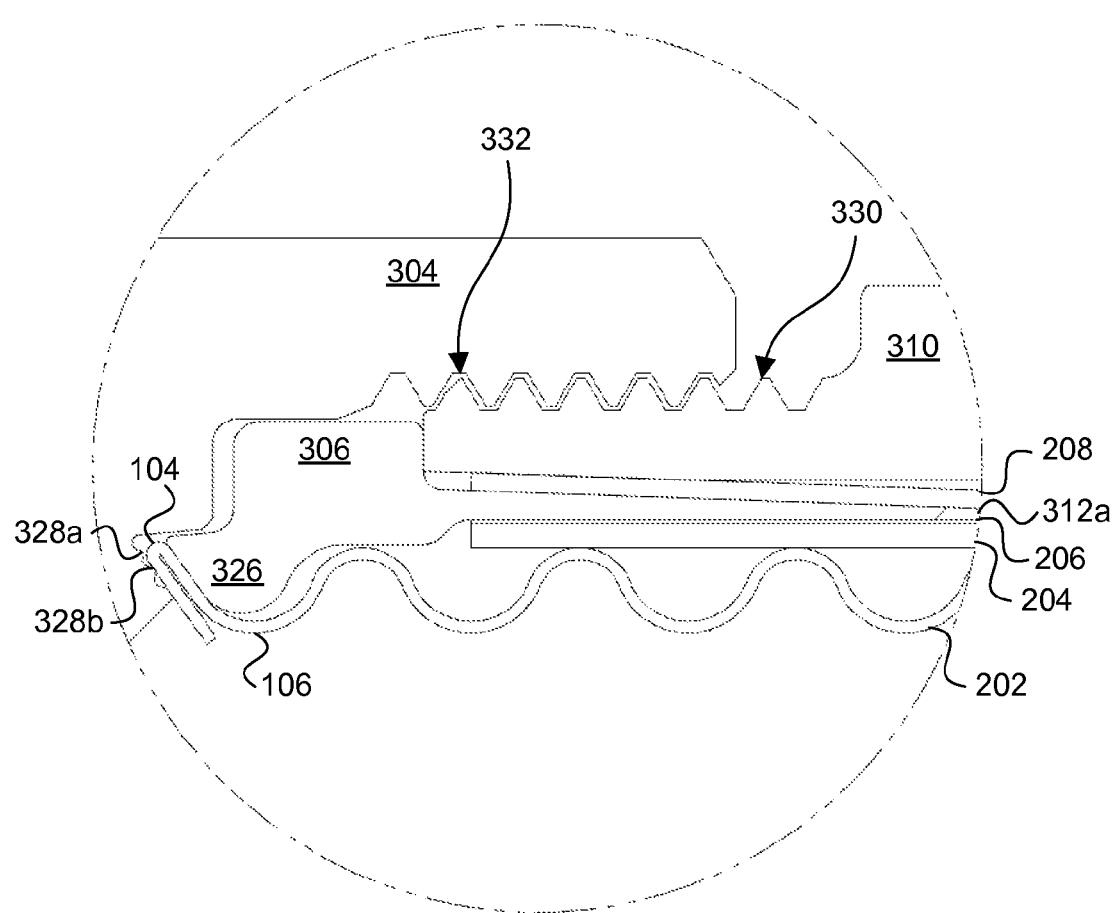
Figure 3E:
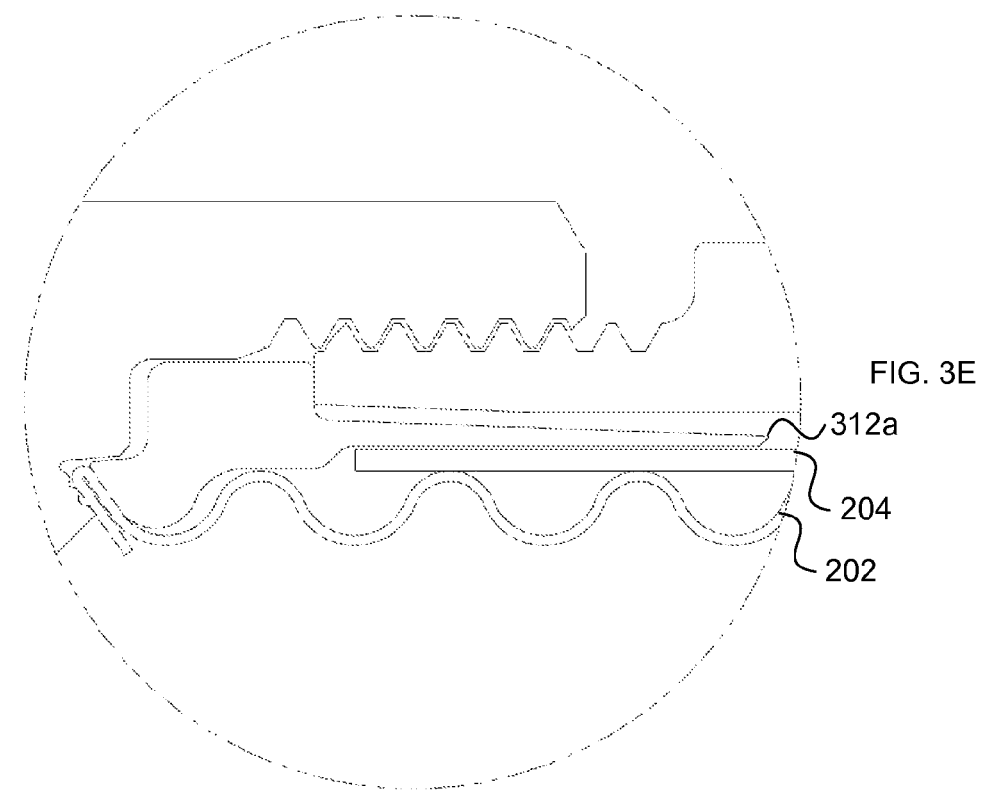
Figure 3F:
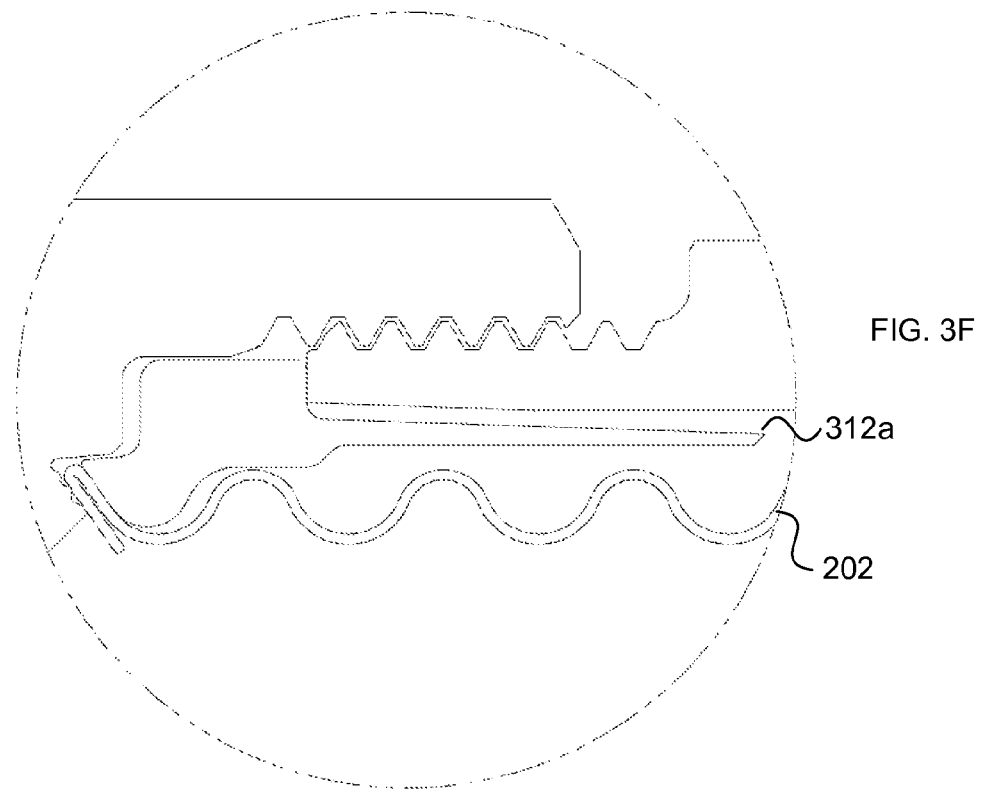

As further illustrated in FIGS. 3B-3D, bushing 306 includes one or more axially-extending tongues 312a, 312b that can be placed in contact with the corrugated tubing 202 and/or one or more of the jacket layers 204, 206, 208. In the embodiment depicted in FIGS. 3B-3D, the axially-extending tongues 312 are placed between metal layer 206 (e.g., a metal foil layer) and an outer resin layer 208. However, other configurations are possible including placement of the tongues 312 between the tubing 202 and jacket layer 204, between jacket layer 204 and jacket layer 206, between jacket layer 206 and jacket layer 208, external to jacket layer 208, and the like. For example, when used in conjunction with single-jacketed tubing, the tongues 312 can be placed between the jacket layer 204 and the tubing 202 or external to the jacket 204 as depicted in FIG. 3E. Likewise, when used in conjunction with unjacketed tubing, the tongues 312 can be placed external to the tubing 202 as depicted in FIG. 3F.

By placing the tongues 312 in contact with one or more conductive jacket layers (e.g., metal foil layer 206) and/or the tubing 202, the tongues 312 can form electrical continuity with one or more the conductive elements of the tubing 200, thereby effectively grounding electrical charges applied to the tubing 200 while minimizing the risk of damage-causing flashover at the sealing device As most clearly seen in FIGS. 3C and 3D, axially-extending tongues 312 can, in some embodiments, be tapered to facilitate placement of the tongues under one or more jacket layers 204, 206, 208. For example, the taper angle between an inner wall and the outer wall of the tongues 312 can be between about 0° and about 5°, between about 0° and about 1°, between about 1° and about 2°, between about 2° and about 3°, between about 3° and about 4°, between about 4° and about 5°, between about 1° and about 4°, between about 2° and about 3°, and the like.

The axially-extending tongues 312 can, in some embodiments, also have a tapered profile when viewed from perpendicular to the longitudinal axis of the tubing 200. A tongue 312 that substantially culminates in a point can enable easier insertion of the tongue 312 between multiple layers of the tubing 200. For example, the tongues 312 can have a substantially semi-circular or triangular profile when viewed from perpendicular to the longitudinal axis of the tubing 200 (depicted in dashed lines in FIGS. 3A-3C).

Bushing 306 can, in some embodiments, be a split bushing. For example, bushing 306 can include two halves 322a, 322b (each having a tongue 312a, 312b) connected by a living hinge. A living hinge allows the bushing to open to allow ribs 326a, 326b to slide over one or more corrugation peaks 104 before resting in a corrugation groove 106 and allowing the bushing 306 to return to a substantially circular profile for engagement with body member 304. In other embodiments, the bushing 306 is a two-piece split bushing such that each half of the split bushing is individually positioned on the tubing prior to insertion into the sleeve portion 308 of the body member 304.

In one embodiment, ribs 326 engage the first corrugation groove 106 of the tubing to facilitate the sealing of the tubing 200 against the body member 304. The ribs 326 can be located on a substantially opposite end of the bushing 306 from the tongues 312. As the nut 310 is advanced, the ribs 326 of the bushing 306 press the tubing 200 against the sealing face of the body member 304, causing the first corrugation peak 104 to collapse and form a gastight seal.

As most clearly visible in FIG. 3D, body member 304 can include a sealing face having one or more sealing circular ridges 328a, 328b configured to facilitate a metal-to-metal gastight seal. Such a sealing architecture is further described in U.S. Pat. Nos. 7,607,700 and 7,621,567 and embodied in the XR2 fitting available from Gastite of Portland, Tenn.

Additionally, the axially-extending tongues 312 described herein can be adopted to a variety of other fitting architectures including, but not limited to, the architectures described in U.S. Patent Application Publication Nos. 2010-0181760 and 2010-0201124, as well as other CSST fittings produced by other manufacturers.

Referring still to FIGS. 3A-3D, nut 310 can have external threads 330 configured to mate with internal threads 332 in the sleeve portion 308 of body member 304. As the nut 310 is rotated, the threads 330, 332 cause the nut 310 to advance towards the body member 304. The nut 310 engages with the tubing 200, the bushing 306, and/or the tongues 312 to drive the tubing 200 forward to crush a corrugation peak 104 to form the seal depicted in FIGS. 3C and 3D.

Nut 310 can have an internal taper complimentary to the external taper of tongues 312. This complimentary taper can advantageously press the tongues 312 against a conductive layer, press a conductive layer against the tongues, and/or compress one or more layers of the jacket between the tongues 312 and nut 310 to retain the jacket within the sealing device.

In some embodiments, one or more components of the sealing device are fabricated from a conductive material such metals or metal alloys. For example, the bushing 306 and the body member 304 can be conductive to facilitate the efficient flow of electricity from the tubing 200 to the bushing 306 to the body member 304 and eventually to ground via whatever device is connected to the body member 304. As will be appreciated by one of ordinary skill in the art, the various components of the sealing device can be fabricated by various techniques including casting, stamping, machining, molding, and the like.

Torque-Limiting Nut

Referring now to FIG. 4, another embodiment of the invention utilizes a nut 400 having a torque-limiting feature. The torque-limiting feature reduces the likelihood of an installer over-tightening or under-tightening a fitting by providing positive feedback to the installer when an appropriate amount of torque is applied to the nut 400.

One embodiment of such a nut 400 includes two hexagonal regions 402 and 404 separated by a notched shear point 406 having a reduced diameter ($D_s$). In some embodiments, the distal hexagonal region 404 has a longer length ($L_d$) than the length ($L_p$) of the proximal hexagonal region 402 to promote the application of torque solely to the distal hexagonal region 404 during installation.

During installation, a wrench, pliers, or other tool is applied to the distal hexagonal region 404 to advance the nut 400 to form a seal as described herein. Once the seal is formed and predetermined amount of torque (e.g., about 50 foot-pounds) is applied to the distal hexagonal region 404, the distal hexagonal portion 404 shears from the remainder of the nut 400 at the shear point 406. In some embodiments, the proximal hexagonal portion 404 remains to allow removal of the nut. In other embodiments, a shear point is positioned between the threaded portion of the nut and the hexagonal portion to preclude removal of the nut 400 for safety purposes.

The amount of permissible torque can be determined by one of ordinary skill in the art by design and/or testing and may vary to reflect various designs, materials, and dimensions of the tubing 200 and sealing device. In general, a deeper notch at shear point 406 will result in the application of less torque before shearing.

Although the nuts 310, 400 are depicted and described herein as hexagonal, one of ordinary skill in the art will readily appreciate that other geometries can be utilized including square, octagonal, and the like.

Methods of Installing Tubing

Figure 5:
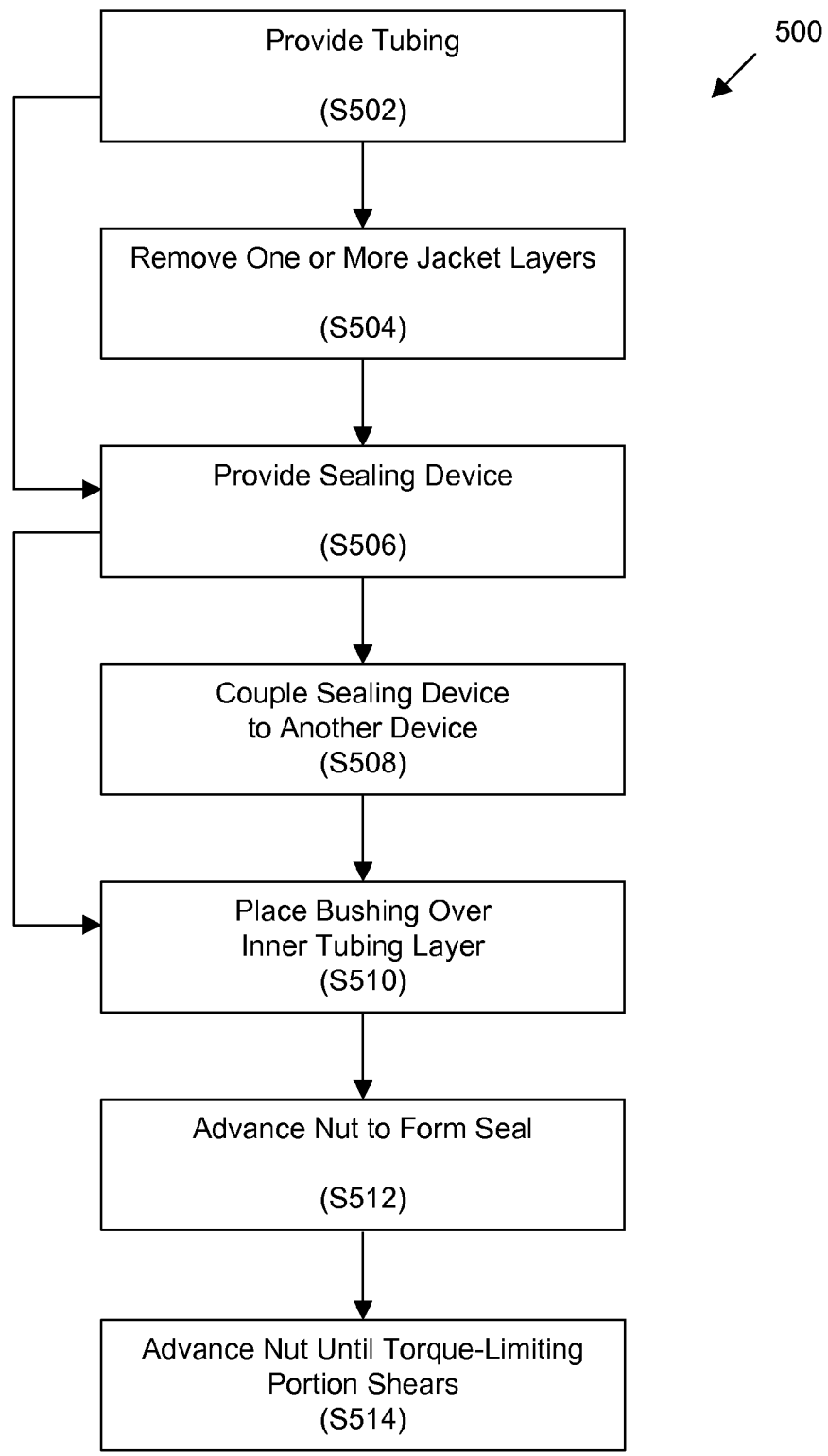
FIG. 5 depicts a method for installing tubing in accordance with a preferred embodiment of the invention.

Tubing can be installed in accordance with existing techniques for the manufacture of CSST. An exemplary method 500 for installing energy dissipative tubing is depicted in FIG. 5.

In step S502, a length of tubing is provided. Tubing can, in some embodiments, be CSST such as unjacketed CSST, jacketed CSST, and energy-dissipative tubing. Tubing may be provided in lengths (e.g., 8' sticks) or on reels.

In step S504, one or more jacket layers are optionally removed in accordance with the instructions for a fitting. The one or more layers can be removed with existing tools such as a utility knife, a razor blade, a tubing cutter, and the like.

In step S506, a sealing device is provided including a body member defining a sleeve portion and a bushing including one or more tongues adapted and configured to be received over at least an inner tubing layer of the length of tubing.

In step S508, the sealing device is optionally coupled to another device. For example, the sealing device can be coupled to a source of a fuel gas such as a pipe, a manifold, a meter, a gas main, a tank, and the like. In another example, the sealing device can be coupled to an appliance that consumes a fuel gas such as a stove, an oven, a grill, a furnace, a clothes dryer, a fire place, a generator, and the like. The sealing device can be coupled to the other device by threaded or other attachments. In some circumstances, pipe seal tape (e.g., polytetrafluoroethylene tape) or pipe seal compound (commonly referred to as "pipe dope") is utilized to facilitate a gastight seal between the sealing device and the other device.

In step S510, the bushing is placed over the inner tubing layer. The bushing can be positioned such that one or more tongues are located between one or more layers of the tubing. For example, the bushing can be positioned such that the one or more tongues are located in contact with a conductive layer of the tubing.

In step S512, a nut is advanced to form a seal. The nut can be advanced by rotating the nut to engage threads in the sleeve portion of the body member.

In step S514, the nut is optionally tightened until a torque-limiting portion of the nut is activated. For example, a portion of the nut may shear off when a predetermined amount of torque is applied to the nut.

INCORPORATION BY REFERENCE

The entire contents of all patents, published patent applications, and other references cited herein are hereby expressly incorporated herein in their entireties by reference.

The invention claimed is:

1. A bushing comprising:
   one or more substantially circumferential ribs adapted to engage one or more corrugations of a tube;
   one or more axially-extending tongues located on a substantially opposite end of the bushing from the one or more substantially circumferential ribs, wherein the one or more axially-extending tongues are tapered toward an end of the bushing;
   wherein the bushing is fabricated from a conductive material; and
   wherein the one or more axially-extending tongues are adapted and configured to form electrical continuity with the tube.

2. The bushing of claim 1, wherein the bushing is a split bushing.

3. The bushing of claim 1, wherein the bushing is a two-piece bushing.

4. The bushing of claim 1, wherein the bushing includes two halves coupled by a living hinge.

5. The bushing of claim 1, wherein the bushing includes at least two axially-extending tongues.

6. The bushing of claim 1, wherein the one or more axially-extending tongues have a substantially semi-circular profile.

7. The bushing of claim 1, wherein the one or more axially-extending tongues have a taper angle of between about 1° and about 4°.

8. The bushing of claim 1, wherein the tube includes one or more conductive jacket layers and the one or more axially-extending tongues are adapted to form electrical continuity with at least one of the one or more conductive jacket layers.

9. A sealing device for connecting a length of tubing, the sealing device comprising:
   a body member defining a sleeve portion; and
   the bushing of claim 1 adapted and configured to be received in the sleeve portion, wherein the one or more axially-extending tongues are adapted and configured to be received over at least one layer of the tubing.

10. The sealing device of claim 9, further comprising:
   a nut adapted and configured for threaded coupling with the body member.

11. The sealing device of claim 10, wherein the bushing and the nut are dimensioned such that as the nut is tightened, the one or more axially-extending tongues are compressed against the tubing by the nut.

12. The sealing device of claim 10, wherein the tubing includes a jacket.

13. The sealing device of claim 12, wherein the bushing and the nut are dimensioned such that as the nut is tightened, one or more layers of the jacket are compressed between an interior surface of the nut and an exterior surface of the one or more axially-extending tongues.

14. The sealing device of claim 12, wherein the bushing and the nut are dimensioned such that as the nut is tightened, the one or more axially-extending tongues are compressed against one or more layers of the jacket by the nut.

15. The sealing device of claim 10, wherein the nut has an external thread and the sleeve portion of the body member has a complimentary internal thread.

16. The sealing device of claim 10, wherein the nut has a tapered inner surface.

17. The sealing device of claim 10, wherein the nut includes a torque-limiting feature.

18. A length of tubing comprising:
   an inner tubing layer; and
   a fitting coupled to an end of the tubing, the fitting including:
      a body member defining a sleeve portion; and
      the bushing of claim 1 extending partially over at least the inner tubing layer and received along with at least the inner tubing layer in the sleeve portion, wherein the one or more axially-extending tongues are adapted and configured to be received over the inner tubing layer.

19. The length of tubing of claim 18, further comprising:
   a conductive layer surrounding the outside of the inner tubing layer, wherein the one or more axially-extending tongues are in contact with the conductive layer.

20. The length of tubing of claim 19, wherein the one or more axially-extending tongues are positioned between the inner tubing layer and the conductive layer.

21. The length of tubing of claim 19, further comprising:
an outer tubing layer surrounding the outside of the conductive layer, wherein the one or more axially-extending tongues are positioned between the conductive layer and the outer tubing layer.

22. A method of installing energy dissipative tubing, the method comprising:
providing a length of tubing including:
an inner tubing layer;
providing a sealing device including a body member defining a sleeve portion and the bushing of claim 1;
placing the bushing over at least the inner tubing layer such that the one or more axially-extending tongues are positioned over the inner tubing layer; and
inserting the bushing and at least the inner tubing layer into the sleeve portion.

23. A length of tubing comprising:
an inner tubing layer;
a conductive layer surrounding the outside of the inner tubing layer;
an outer tubing layer surrounding the outside of the conductive layer; and
a fitting coupled to an end of the tubing, the fitting including:
a body member defining a sleeve portion; and
the bushing of claim 1 extending partially over at least the inner tubing layer and received along with at least the inner tubing layer in the sleeve portion, wherein the one or more axially-extending tongues are positioned between the conductive layer and the outer tubing layer.

\* \* \* \* \*